US012453655B2

(12) United States Patent
Keller

(10) Patent No.: US 12,453,655 B2
(45) Date of Patent: Oct. 28, 2025

(54) SURGICAL RING DESIGN WITH VARYING WALL THICKNESS AND CONSISTENT CROSS-SECTIONAL AREA

(71) Applicant: Centricity Vision, Inc., Carlsbad, CA (US)

(72) Inventor: Christopher Guild Keller, El Cerrito, CA (US)

(73) Assignee: Centricity Vision, Inc., Carlsbad, CA (US)

( * ) Notice: Subject to any disclaimer, the term of this patent is extended or adjusted under 35 U.S.C. 154(b) by 388 days.

(21) Appl. No.: 18/314,447

(22) Filed: May 9, 2023

(65) Prior Publication Data

US 2023/0363942 A1 Nov. 16, 2023

Related U.S. Application Data

(60) Provisional application No. 63/340,546, filed on May 11, 2022.

(51) Int. Cl.
*A61F 9/007* (2006.01)
*A61B 17/00* (2006.01)
*A61B 17/3205* (2006.01)
*G05B 19/18* (2006.01)

(52) U.S. Cl.
CPC ........ *A61F 9/00754* (2013.01); *G05B 19/182* (2013.01); *A61B 2017/00526* (2013.01); *A61B 17/32053* (2013.01); *G05B 2219/37087* (2013.01)

(58) Field of Classification Search
CPC .............. A61F 9/00736; A61F 9/00754; A61F 2230/0006; G05B 19/182; G05B 2219/37087; A61B 17/32; A61B 17/3205; A61B 17/32053; A61B 2017/00526; A61B 2017/308; A61B 18/08; A61B 18/082; A61B 2018/00291; A61B 2018/00321; A61B 2018/00601; A61B 2018/00791; A61B 2090/061; A61B 2090/064
See application file for complete search history.

(56) References Cited

U.S. PATENT DOCUMENTS

2018/0125711 A1  5/2018  Keller
2019/0380872 A1  12/2019 Keller
2022/0031510 A1  2/2022  Keller et al.

OTHER PUBLICATIONS

PCT International Search Report and Written Opinion, PCT Application No. PCT/US2023/21529, May 9, 2023, 10 pages.

*Primary Examiner* — Robert A Lynch
(74) *Attorney, Agent, or Firm* — Fenwick & West LLP

(57) ABSTRACT

A design is described herein for rings and for cutting rings for a device used in capsulotomy procedures. A set of ring dimensions can describe a desired height of a ring at each location of the ring. The set of ring dimensions is also associated with an intended wall thickness, and thus is associated with an intended cross-sectional area at each ring location. A wall thickness at each portion of a can vary from the intended wall thickness specified by the set of ring dimensions at various locations of the ring. At these locations, the height of the ring can be varied such that the resulting cross-sectional area of the ring at these locations is substantially similar to the intended cross-sectional area of the ring at the locations.

21 Claims, 12 Drawing Sheets

SURGICAL RING DESIGN WITH VARYING WALL THICKNESS AND CONSISTENT CROSS-SECTIONAL AREA

CROSS-REFERENCE TO RELATED APPLICATION

The present application claims the benefit of U.S. Provisional Patent Application No. 63/340,546 filed on May 11, 2022, which is hereby incorporated by reference in its entirety.

BACKGROUND

This description generally relates to components for medical devices and specifically for microsurgical instruments for capsulotomies.

Current tissue cutting devices often include a symmetric cutting ring for excising a portion of tissue. In theory, a purely symmetric conductive ring will have completely even electrical current flow with the same current density at all ring locations. However, in practice, tubing has a threshold tolerance for wall thickness uniformity. The interior surface of tubing may not be concentric with the exterior surface of tubing, causing fluctuations in wall thickness around rings. Due to variations in the wall thickness of a tube, metal will not heat up uniformly around the ring. Portions of the ring with thicker walls will have cold regions and portions with thinner walls will have hot regions. This uneven heating is due to current density, which is greater in parts of the ring with less thick walls and lesser in parts of the ring with thicker walls. Uneven concentrations in current density and energy propagation at various ring locations may negatively affect the ring's intended use for tissue cutting. This fundamental problem is accentuated if sequential micropulses of energy are delivered via the ring into tissues at fast speeds to achieve adequate tissue disruption while minimizing collateral tissue damage.

SUMMARY

Embodiments relate to systems, methods, and non-transitory computer-readable mediums that enable the dynamic cutting of rings for a device used in capsulotomies. The device includes a series of ring features whose geometries help prevent the formation of cold spots and/or hot spots resulting from structural asymmetries of the cutting element, such as various tabs of the cutting element. In addition, ring features help maintain the mechanical strength of the cutting element and provide a stronger physical attachment to a suction cup of the device due to improved tab configurations. Tabs may include one or more wire tabs, one or more mechanical tabs, and/or one or more anchor tabs. Ring features may include slots, cutouts, and/or bumps. Ring features can also be used to mitigate the formation of hot or cold spots in other situations where electrical current flow in a device is uneven due to any other type of spatial asymmetry in addition to the various types of tab structures discussed herein.

The wall thickness of the tubing that is used to cut individual rings is a key parameter in the manufacture of optimal capsulotomy rings. The cross-sectional area at each circumferential location along the ring determines the current density at that location. Preferred current densities may be established by testing. In manufacture, tubing with a correct wall thickness and cut to a correct height will provide the desired current density. In the ideal situation, tubing with a constant wall thickness is used for manufacture, allowing a constant ring height to be cut to achieve constant current density at all locations along the ring. In practice, tubing wall thickness can vary at different locations and be thinner than intended in some areas and thicker than intended at others.

In some embodiments herein, ring heights at various locations along a ring are varied based on a wall thickness at each location so that the ring has an intended cross-sectional area at each location, and thus has an intended current density at each location. A ring design includes a set of ring dimensions describing a height of a ring at each location of the ring based on the wall thickness of the ring at each location. Accordingly, the ring design varies according to the wall thickness at each location of the ring at each location of the ring, such that the resulting cross-sectional area and the intended cross-sectional area for the ring is substantially similar. At locations of the ring that have features such as anchor tabs, tabs for electrical leads, and the like, the height of such features may also be adjusted according to wall thickness to maintain an intended constant cross-sectional area. At locations of the ring where the ring thickness is greater than intended (determined, for instance, by one or more measurement techniques prior to cutting the ring), the design of the ring can be modified such that the height of the ring at these locations is decreased. Likewise, at locations of the ring where the ring thickness is less than expected, the design of the ring can be modified such that the height of the ring at these locations is increased. In such instances, the resulting ring has a cross-sectional area at every location that is substantially similar to the intended cross-sectional area of the ring design at these locations.

The figures depict various example embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

Figure 1A:
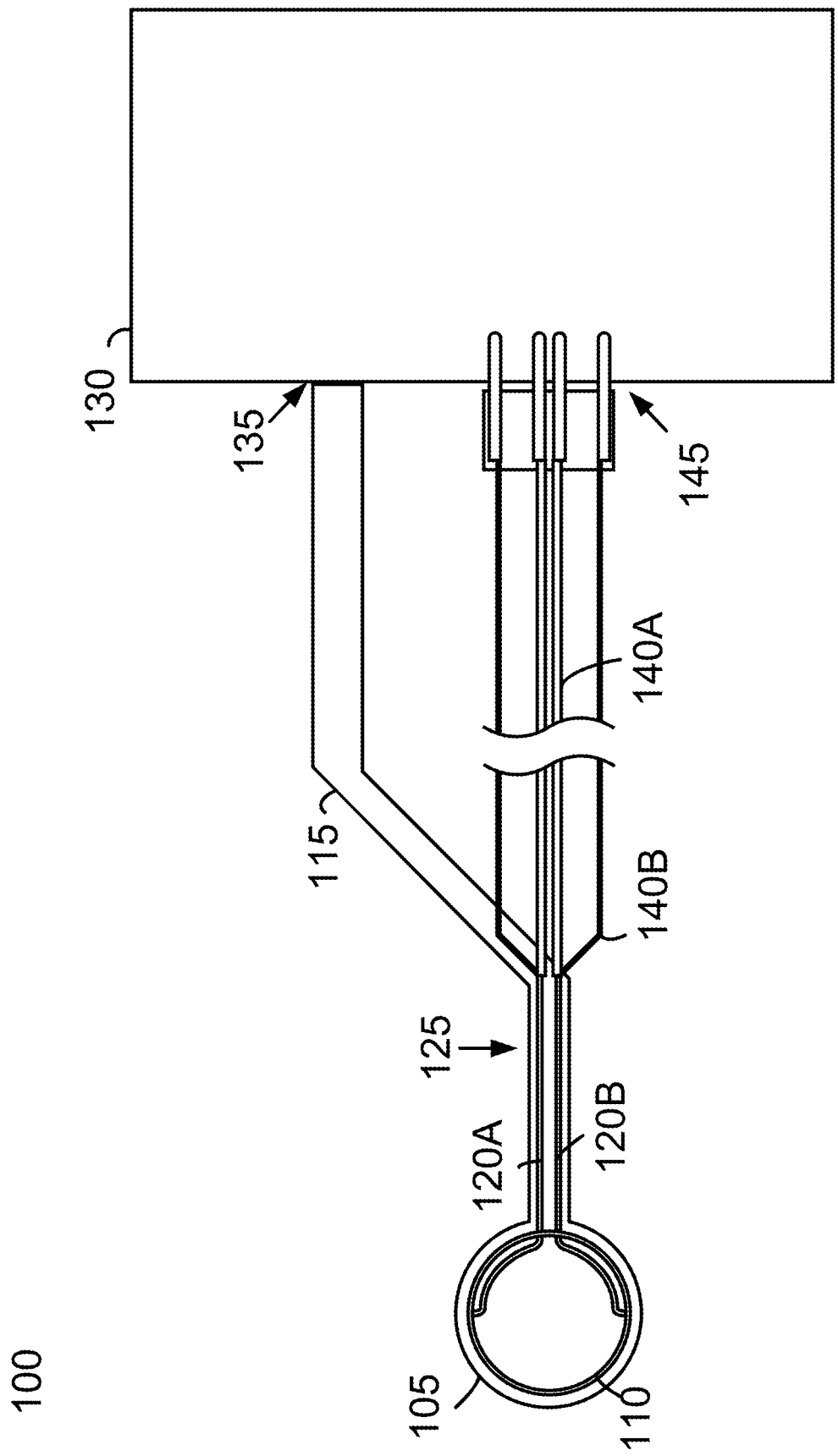
FIG. 1A illustrates a microsurgical device, according to one embodiment.
Figure 1B:
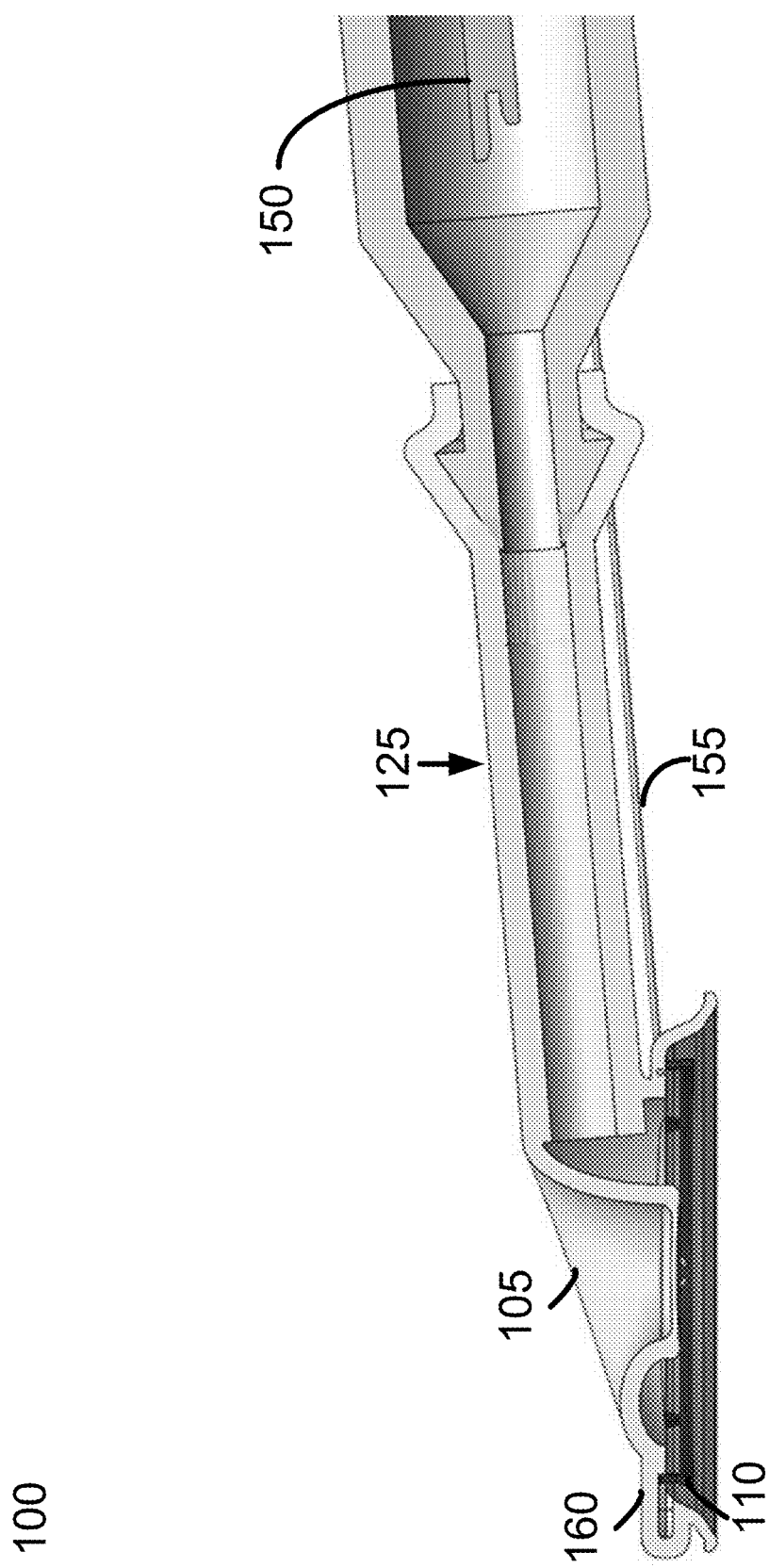
FIG. 1B illustrates a cross-sectional view of the microsurgical device shown in FIG. 1A, according to one embodiment.
Figure 1C:
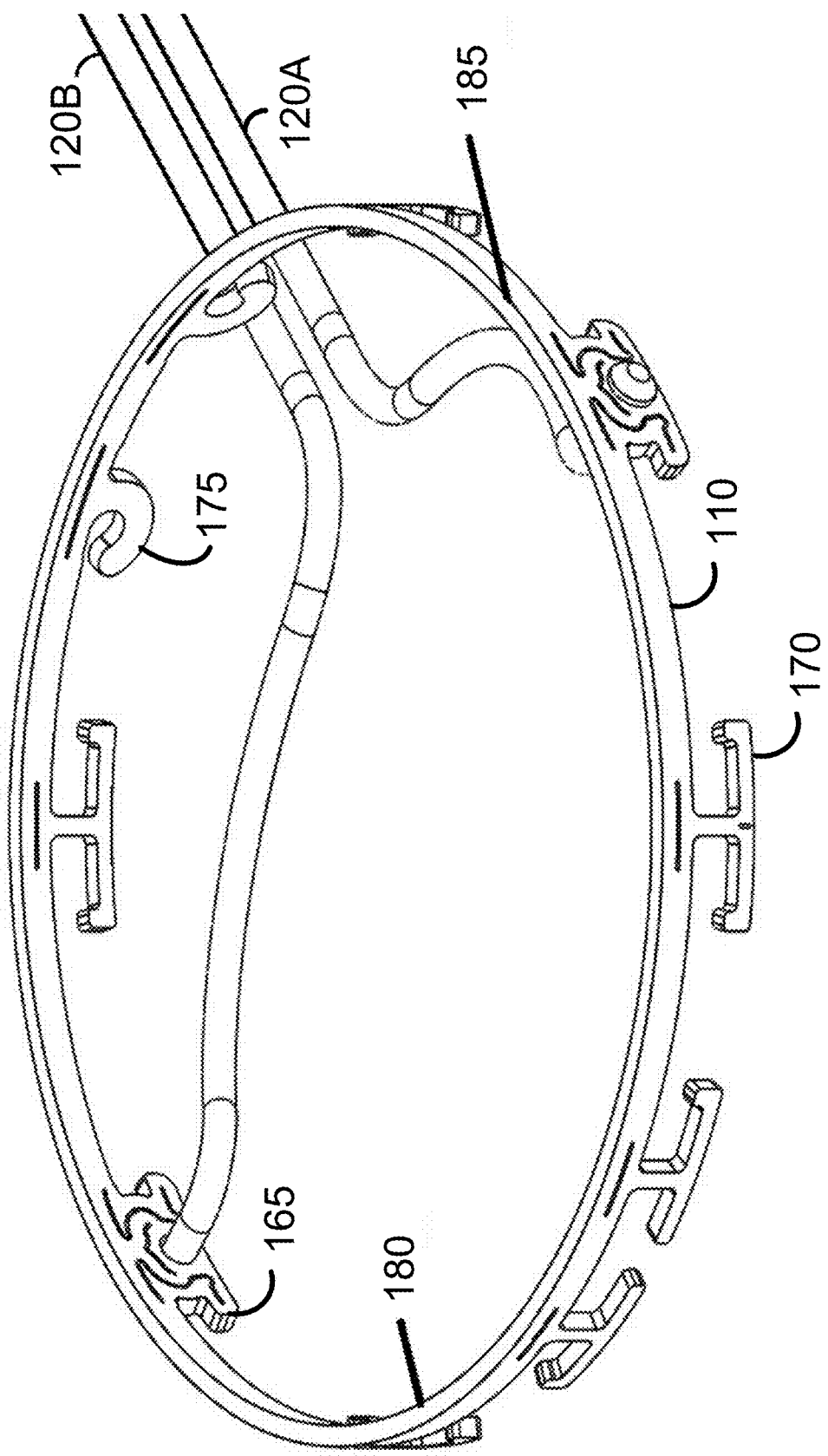
FIG. 1C illustrates a bottom perspective view of the cutting element of the microsurgical device shown in FIG. 1A, according to one embodiment.

Figures (FIGS. 1A-1C illustrate various views of a microsurgical device 100 for tissue cutting. FIG. 1A illustrates an embodiment of a microsurgical device 100. FIG. 1B illustrates a cross-sectional view of the microsurgical device 100. FIG. 1C illustrates a bottom perspective view of the cutting element of the microsurgical device 100.

The device 100 shown in FIG. 1A includes a suction cup 105, a cutting element 110 (also referred to as "cutting ring" herein), one or more suction tubes 115, electrical leads 120A, 120B, and a stem 125. The suction cup 105 and cutting element 110 are located at a distal end of the stem 125, which houses the one or more suction tubes 115 and the electrical leads 120A, 120B. The device 100 further includes a control console 130 (also referred to as "controller" herein) that is configured to provide suction to the suction cup 105 and electrical energy to the cutting element 110. The suction cup 105 is connected to the control console 130 via the one or more suction tubes 115 and a suction connector 135. The cutting element 110 is connected to the control console 130 via the electrical leads 120A, 120B, one or more sets of electrical conductors, such as electrical conductors 140A, 140B, and an electrical connector 145.

The suction cup 105 is a foldable structure that can provide a water-tight seal between the edges of the suction cup 105 and the tissue being excised (e.g., lens capsule, corneal tissue, connective tissue, and the like). Because of the fluidic seal between the suction cup 105 and the tissue, vacuum pressure can be applied to the suction cup 105 and the tissue so that the resulting pressure presses the cutting element 110 against the tissue. Pressing the cutting element 110 against the tissue facilitates a more precise, smoother cut. The foldable structure of the suction cup 105 is reversibly collapsible such that a cross-section of the suction cup 105 can decrease for insertion of the device 100 through an incision. As such, the suction cup 105 may include a compliant material, such as silicone, polyurethane, and the like.

The cutting element 110 is an element designed to cut tissue through application of pressure and/or electrical current via one or more electrical leads 120A, 120B coupled to the cutting element 110. The cutting element 110 can be made from various materials. In some embodiments, the metallic components of the cutting element 110 may be made by electroforming suitable materials such as nickel, nickel-titanium alloys, gold, steel, copper, platinum, iridium, molybdenum, tantalum, and the like. The cutting element 110 may be cut from a tube. The tube may be standard thin wall nitinol tubing with a tolerance of +/−15 microns for wall thickness uniformity. The inside surface of the tubing may not be concentric with the outside surface such that when a ring is cut at a constant height, the electrical current carrying across the ring will vary around the circumference. In order to allow for constant current density and energy propagation, the height of the ring may be modified to maintain a consistent current carrying cross-sectional area so that current density and Joule heating are uniform. When the cutting element 110 is configured to electrically excise tissue, the material for the cutting element 110 is electrically conductive. In addition, the cutting element 110 is reversibly collapsible such that a cross-section of the cutting element 110 can decrease for insertion of the device 100 through an incision. Therefore, the material of the cutting element 110 is generally elastic so that it can return to its original shape after insertion of the device 100 through the incision. A typical construction example is a superelastic nitinol ring having a wall thickness of 0.075 mm, height of 0.140 mm, and tabs as described in this specification. Another strategy is to add to this superelastic body a thin film (e.g., 0.0001 to 0.002 mm) of a more conductive material that does not have to be superelastic because it is very thin. Examples of materials include, but are not limited to, spring steel, stainless steel, titanium nickel alloy, graphite, nitinol, nickel, nickel-chrome alloy, tungsten, molybdenum, tantalum, gold, silver, copper, or any other material that will allow the cutting element 110 to return to its prior shape.

The device 100 is capable of delivering a wide range of energies (e.g., from 0 to 3 joules, or more) via the cutting element 110. The energy dissipated by the cutting element 110 during use in surgery may be determined empirically through use on a specific tissue of interest. For example, in a capsulotomy of the anterior lens capsule of an adult human, it was found that about 1.2 joules produce a satisfactory result. Some specific examples of applications to lens capsulotomies include pediatric, adult, and dog, listed in order of increasing energy need. To accommodate the varying energy needs, the amount of energy dissipated by the cutting element 110 may be controlled by controlling parameters such as the number of pulses, duration of each pulse, time between pulses, and/or energy of each pulse applied to the tissue via the cutting element 110. These parameters may be determined empirically for each tissue application and/or via computational modeling. In addition, temperature gradients in the cutting element 110 may be designed and/or modified for different tissues.

It is helpful to have a uniform wall thickness over the entire circumference of the cutting element 110 to maintain the correct current density and heating everywhere along the cutting element 110. The standard methods of drawing nitinol tubing may result in excessive variation in wall thickness. In areas that are thicker, the temperature will be too low, and a relative cold spot may occur. In areas that are too thin, a relative hot spot may occur. One method of making a uniform wall thickness is to build up the nitinol tubing by sputtering nitinol onto a rotating mandrel in a vacuum chamber. In practice, tubes produced by nitinol sputtering still exhibit variations in circumferential wall thickness that when cut into individual rings manifest variations in current density at different ring locations, creating undesired cold and/or hot spots that affect tissue cutting.

Another method to make a uniform wall thickness is to take drawn nitinol tubing with a nominal wall thickness greater than the desired final wall thickness of the cutting element 110, cut the tubing into short lengths (e.g., 25 mm). Bring the inner diameter to the correct dimension and roundness by using common machining methods such as honing, ID grinding, lapping, and polishing. These mechanical methods to correct wall thickness variations may be tedious, difficult to implement, and costly to incorporate into manufacture. Cool it to transform it into low stiffness martensite and force the piece onto a slightly oversized precision round support shaft to force the inner diameter to be round. Or instead, heat the nitinol to increase its diameter (e.g., heat to 400 C) so it can be slid without force over the cold mandrel. Then the outer diameter can be precision ground, lapped, and/or polished to also be round, concentric to the inner diameter and have the desired final wall thickness. The outer surface of the support shaft is a material that can be etched away without affecting nitinol or the body of the shaft. For example, the support shaft may be solid, or tubular 316 stainless steel, with a thin layer (e.g., 0.02 mm) of copper plated or sputtered on it. Other materials that can be etched away without harming the nitinol or mandrel can be used (copper is easy as it can be quickly removed with nitric acid, and nitric acid passivates nitinol). After the nitinol is machined to have uniform wall thickness, the support shaft is mounted onto a femtosecond laser cutting system that supports both ends of the shaft on frictionless air bearings such that it can be precisely rotated and translated by computer-controlled actuators. A side view pattern can then be cut into the tube. The laser beam does not fully penetrate the etchable layer, so the support shaft remains undamaged and can be reused. The cutting element 110 slides off the shaft after the etchable layer is etched away. Another option in construction is that after the sacrificial etchable layer is deposited, one or more layers of other materials may be deposited prior to mounting the nitinol on the mandrel. For example, a precision mandrel of stainless steel may have a layer of copper deposited (e.g., 0.02 mm), and on top of the copper, a layer of molybdenum could be deposited (e.g., 0.001 mm), and then a layer of tantalum (e.g., 0.0001 mm). One way to deposit these layers is by sputtering on the mandrel spinning about its long axis. Another method is by electroplating. The laser cutting beam stops in the Cu layer, so the NiTi, Ta, and Mo layers are all cut through. After etching away the Cu, the Mo/Ta layers are held by compressive force in the nitinol ring (since the NiTi was heated to slide over the mandrel, and then shrunk down when cool). The Mo layer will carry 15 times more current than the same thickness of NiTi, so it allows more of the power to be dissipated at the ID of the cutting edge, and the wall thickness of the NiTi can be decreased which enables it to be bent to a smaller radius as needed to enter a smaller incision in tissue.

The one or more suction tubes 115 are located within the stem 125 of the device 100. The one or more suction tubes 115 are configured to provide suction to the suction cup 105. The one or more suction tubes 115 provide suction to the suction cup 105 to compress the suction cup 105 against the tissue being excised. The one or more suction tubes 115 may also be configured to reverse the suction fluid flow being applied to the suction cup 105 to disengage the suction cup 105 and cutting element 110 from the excised tissue.

The one or more suction tubes 115 may be further configured to act as fluid paths. For example, the one or more suction tubes 115 may be primed before use with a solution, such as a balanced salt solution. Priming the fluid paths of the one or more suction tubes 115 helps ensure that there is little to no compressible air in the device 100. In addition, after excision of the tissue is complete, a hydraulic release of the one or more suction tubes 115 may be performed to release the suction cup 105 from the tissue. In some embodiments, the hydraulic release consists of forcing 0.05 ml to 0.2 ml of a balanced salt solution from the suction tubes 115 back into the suction cup 105.

The configuration of the suction tubes 115 along the inner surface of the suction cup 105 may vary. For example, when there are two or more suction tubes 115, the suction tubes 115 may be located at antipodal points of the suction cup 105. This configuration may ensure equal distribution of suction throughout the suction channel of the suction cup 105. In other embodiments, the suction tubes 115 may be adjacent, located within a threshold number of degrees of each other, located within a threshold distance of each other, and the like. Further, the suction tubes 115 may be located along an outer surface of the suction cup 105, along a bottom surface of the suction cup 105, along a top surface of the suction cup 105, and the like. In embodiments where the device 100 includes a single suction tube 115, the suction tube may be located at any point along the inner surface of the suction cup 105. For example, an orifice of the suction tube 115 may be located in a roof of the suction cup 105, at a proximal end of the suction cup 105, at a distal end of the suction cup 105, and the like.

The electrical leads 120A, 120B are configured to provide electrical energy to the cutting element 110. The electrical leads 120A, 120B are located within the stem 125 of the device 100 and coupled to a surface of the cutting element 110. In some embodiments, the electrical leads 120A, 120B are silver wires. In other embodiments, the electrical leads 120A, 120B are made of copper, aluminum, gold, or the like. In addition, the electrical leads 120A, 120B may be insulated.

The control console 130 is configured to provide suction to the suction cup 105 and electrical energy to the cutting element 110. In addition, an operator of the device 100 may control the depth of cut via the control console 130 by modifying the suction and/or electrical parameters of the device 100.

Suction is provided to the suction cup 105 via one or more suction tubes 115 connected to the control console 130 and a suction connector 135. Using the control console 130, an operator of the device 100 may provide suction to the suction cup 105, reverse suction during disengagement of the device 100, and/or flush the fluid paths of the one or more suction tubes 115 with a solution. In addition, an operator of the device 100 may modify the amount of suction applied to the suction cup 105 based on the operation being performed. In some embodiments, an operator of the device 100 may manually modify the amount of suction applied to the suction cup 105, for example using a vacuum valve and a vacuum gauge of the control console 130. Alternatively, or additionally, the control console 130 may include predetermined suction parameters determined via experimentation, modeling, and/or a combination thereof that are each associated with a procedure. In addition, using the control console 130, different amounts of suction may be provided to different suction tubes. By way of example, suction pressure of 19−/+1 inch of Hg vacuum has been used successfully. That is gauge pressure, not absolute pressure, so the same pressure differential is established by the console across the suction cup wall regardless of altitude at which it is used.

The control console 130 delivers electrical energy to the cutting element 110 via the electrical leads 120A, 120B, one or more sets of electrical conductors 140A, 140B, and an electrical connector 145. A first set of electrical conductors 120A and 120B may be configured to provide power to the cutting element 110. A second set of electrical conductors 140A and 140B may be for resistance measurement and may be connected to a measurement device, such as a Kelvin probe (also known as the 4-wire resistance measurement method). In some embodiments, the first set of electrical conductors 120A and 120B and/or the second set of electrical conductors 140A and 140B are copper wires, such as (respectively) 24 ga copper wires, 30 ga copper wires, and the like. In other embodiments, the first set of electrical conductors 120A and 120B and/or the second set of electrical conductors 140A and 140B are composed of aluminum, gold, silver, copper core nitinol tubing, or the like. Electrical energy may be provided to the cutting element 110 as one or more electrical waveforms. The one or more electrical waveforms are discharged through the cutting element 110 to cause the cutting element 110 to heat up for a short time, such as 0.0001 seconds to 0.05 seconds, depending on the applied voltage and current.

Using the control console 130, the depth of cut may be controlled by controlling the amount of electrical discharge applied to the cutting element 110. For example, the depth of cut may be controlled by modifying one or more of: the energy of each pulse, the number of pulses in the pulse train, the inter-pulse intervals, and the like. As with the suction, these parameters may be manually modified by an operator of the device 100 using control elements of the control console 130. Alternatively, or additionally, the control console 130 may include predetermined sets of parameters that are each associated with different depths of cut, different patient types, and the like. These sets of parameters may be determined through experimentation, modeling, and/or a combination thereof. The control console 130 may be a controller, microprocessor, a programmable hardware logic, etc.

In some embodiments, the control console 130 may change the operating parameters of the device 100 automatically. For example, the control console 130 may change the operating parameters according to a predetermined set of operating steps associated with a procedure. Alternatively, or additionally, the control console 130 may change the operating parameters of the device 100 based on feedback from the device 100 itself. For example, the control console 130 may change the operating parameters of the device 100 in response to a detection of a pressure, a pressure change, a temperature, a temperature change, a determined depth of cut, or the like, during use. In one embodiment, the controller measures the change in resistance of the cutting element to provide a measurement of its temperature. The controller uses that information to increase, or cut short, the delivery of energy to the cutting element to maintain adherence to a predetermined formula for temperature versus time for the cutting process. Variations in the cross-sectional area at each location leads to variations in current density at those locations and can create cold spots that fail to cut tissue or hot spots that may cause more damage to adjacent tissue than desired.

FIG. 1B illustrates a cross-sectional view of the microsurgical device 100. As shown, the cutting element 110 is coupled to an inner surface of the suction cup 105 for excising a portion of the tissue abutting the outer surface of the suction cup 105 and/or cutting element 110. In alternative configurations, the cutting element 110 may be coupled to an outer surface of the suction cup 105, along a bottom surface of the suction cup 105, along a top surface of the suction cup 105, or the like.

In the embodiment shown, the device 100 includes a rigid extender 150 and an anchor thread 155. The rigid extender 150 is retractable and used to reversibly compress the suction cup 105 and cutting element 110 for insertion of the device 100 through an incision, such as an incision of a cornea of an eye. To insert the device 100 into the eye, the rigid extender 150 stretches the suction cup 105 and cutting element 110 in one direction while the anchor thread 155 stretches the suction cup 105 and cutting element 110 in the opposite direction. This reversibly straightens out and decreases the cross-section of the suction cup 105 and cutting element 110 so that the suction cup 105 and cutting element 110 can go through the incision. Examples of incision sizes commonly used in surgery include 1.8 mm, 2.0 mm, 2.2 mm, 2.4 mm, etc.) As the rigid extender 150 is removed from the eye, the suction cup 105 and cutting element 110 elastically return to their original shape. The rigid extender may also be used to straighten the device after tissue cutting to facilitate device removal from the eye. There may be sufficient slack in the anchor thread 155 so that the cutting element 110 is not constrained except during extension of the rigid extender 150 and removal of the device 100 from the eye. The anchor thread 155 may be made from Vectran, a fiber that can withstand high temperature. The anchor thread 155 may alternatively be made from a thin stainless steel wire (e.g., 0.001 to 0.002 inch in diameter) coated with an insulator (e.g., PFA (perfluoroalkane) that is 0.0001 to 0.002 inches thick). In some embodiments, the device 100 includes a pocket 160 to house the rigid extender 150 once extended. In some embodiments, the device 100 does not include a rigid extender 150 anchor thread 155, and/or pocket 160.

FIG. 1C illustrates a bottom perspective view of the cutting element 110 of the microsurgical device 100. The bottom of the cutting element 110 is continuous such that current can flow around the bottom of the cutting element 110 in a continuous path and generate the heat necessary for excising tissue. The cutting element 110 includes tabs, such as tabs 165, 170, 175, that are configured to couple the electrical leads 120A, 120B to the cutting element 110, couple the suction cup 105 to the cutting element 110, and/or couple an anchor thread 155 to the cutting element 110. The cutting element 110 and/or tabs may include features, such as slots, cutouts, and bumps, to remove hot and/or cold spots and maintain the mechanical strength of the cutting element 110.

The cutting element 110 may be configured so that it lies perpendicular to the surface of the tissue being excised. For example, the cutting element 110 shown in FIG. 1C is cylindrical such that the cutting element 110 is substantially perpendicular to the portion of the tissue being excised. In addition, the cutting element 110 may be configured such that only an inner corner edge 180 of the cutting element 110 excises the tissue. Alternatively, the cutting element 110 may be configured such that only the outer corner edge 185 of the cutting element 110 excises the tissue, both the inner corner edge 180 and outer corner edge 185 of the cutting element 110 excise the tissue, or the like. In addition, the cutting element 110 may be elliptical, conical, linear, square, rectangular, triangular, or any other suitable shape to match the geometry of the tissue being excised.

The device 100 shown includes two electrical leads 120A, 120B. Alternatively, the device 100 may include greater or fewer electrical leads, such as one electrical lead, three electrical leads, four electrical leads, etc. The points at which the electrical leads 120A, 120B couple to the cutting element 110 may vary. For example, when the electrical leads 120A, 120B are positioned on opposite sides of the cutting element 110, the current can travel in opposite directions to conduct current uniformly around the portion of the tissue being excised. Alternatively, the electrical leads 120A, 120B may be located at positions that are a threshold distance apart, a threshold number of degrees apart, or the like.

The electrical leads 120A, 120B may be located within the one or more suction tubes 115. In other embodiments, the electrical leads 120A, 120B may be located outside of the one or more suction tubes 115. For example, the electrical leads 120A, 120B may be coupled to an outer surface of the one or more suction tubes 115, adjacent to the one or more suction tubes 115, and/or separated by a threshold distance from the one or more suction tubes 115, etc.

Figure 2:
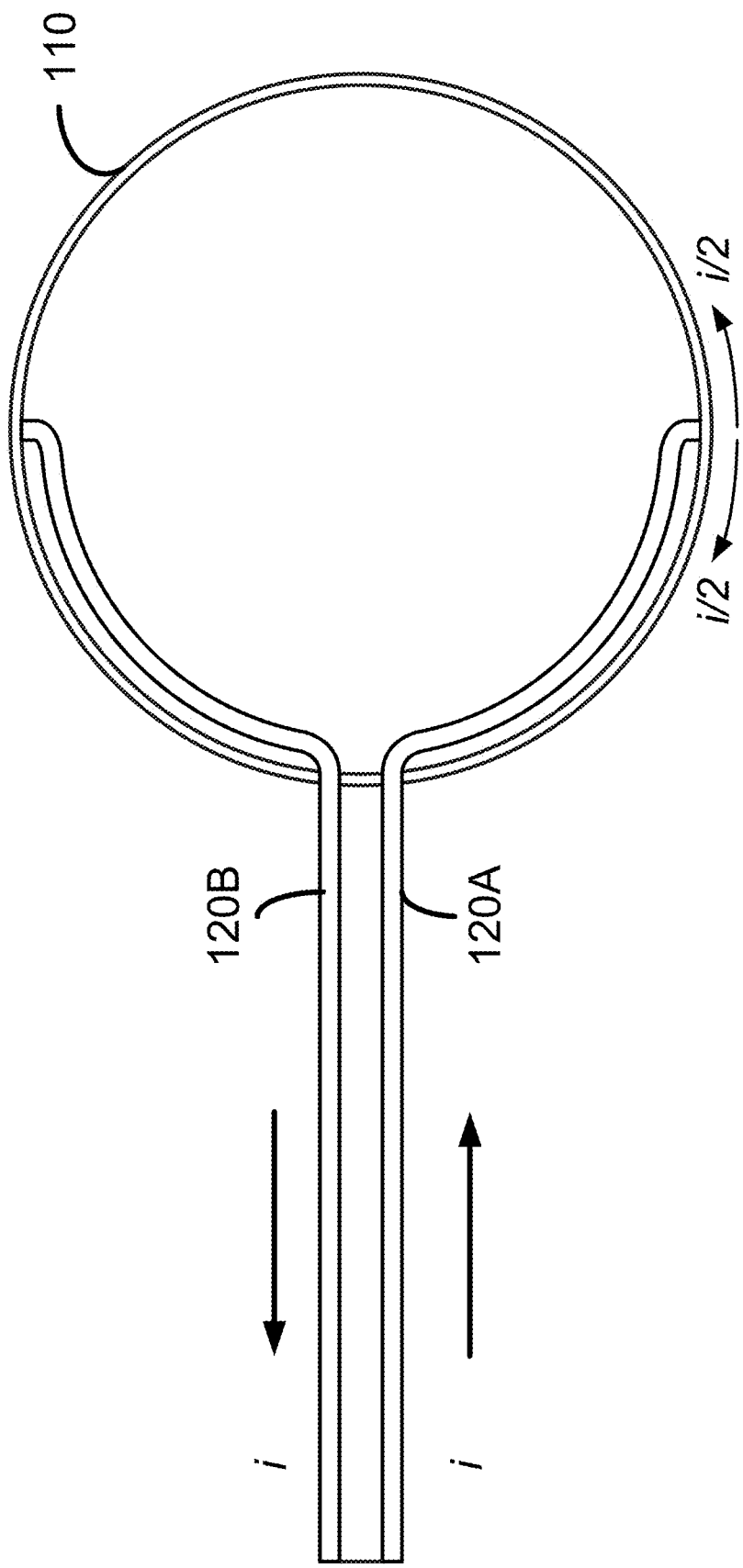
FIG. 2 illustrates the flow of current through the cutting element of the microsurgical device shown in FIG. 1A, according to one embodiment.

FIG. 2 illustrates the path of electrical current flow (i) within the cutting element 110. Upon entering the cutting element 110 through an electrical lead 120A, a portion of the current, such as one half of the current ($i_{1/2}$), travels along one half of the cutting element 110, while another portion of the current, such as the other half of the current ($i_{1/2}$), travels along the other half of the cutting element 110. Current then exits the cutting element 110 at the other electrical lead 120B. Due to the electrical resistance of the cutting element 110, the current flow causes a rapid increase in the temperature of the cutting element 110. Because of the rapid increase in temperature, the water molecules near or adjacent to the cutting element 110 and the tissue being excised vaporize rapidly and mechanically fracture the tissue along the path dictated by the portion of the cutting element 110 abutting the tissue being excised.

Ring Modification and Design

Embodiments of ring dimension modification systems, methods, and non-transitory computer-readable mediums described herein enable the automated modification of ring cutting paths to allow for a constant current density to flow through rings in the device 100.

Figure 3:
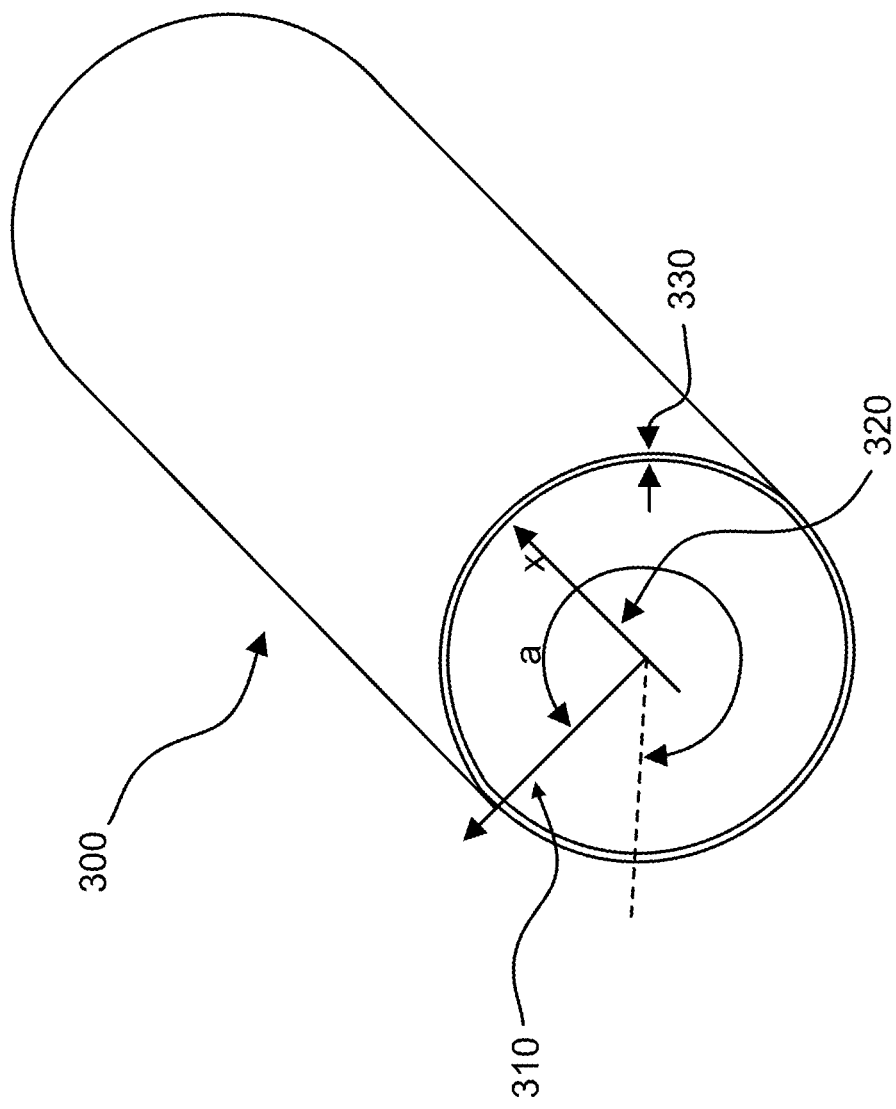
FIG. 3 is an example tube mapped with cylindrical coordinates, according to one embodiment.

FIG. 3 illustrates a cylindrical coordinate mapping of a tube 300 for creating rings. Axial position "x" 320 may be used to map the tube by establishing a centerline and axis of rotation of the tube. Radial position "r" 310 is perpendicular from the x axis 320, and rotational position "a" may be used with the axial position "x" 320 to determine a location of any point of the tube. Coordinates (x, r, a) may be used to map any part of the tube, for example to determine a position to cut the tube into rings. The tube also has a wall thickness 330. The wall thickness 330 may vary at different parts of the tube, creating uneven current flow and temperature elevation in resulting rings.

Figure 4:
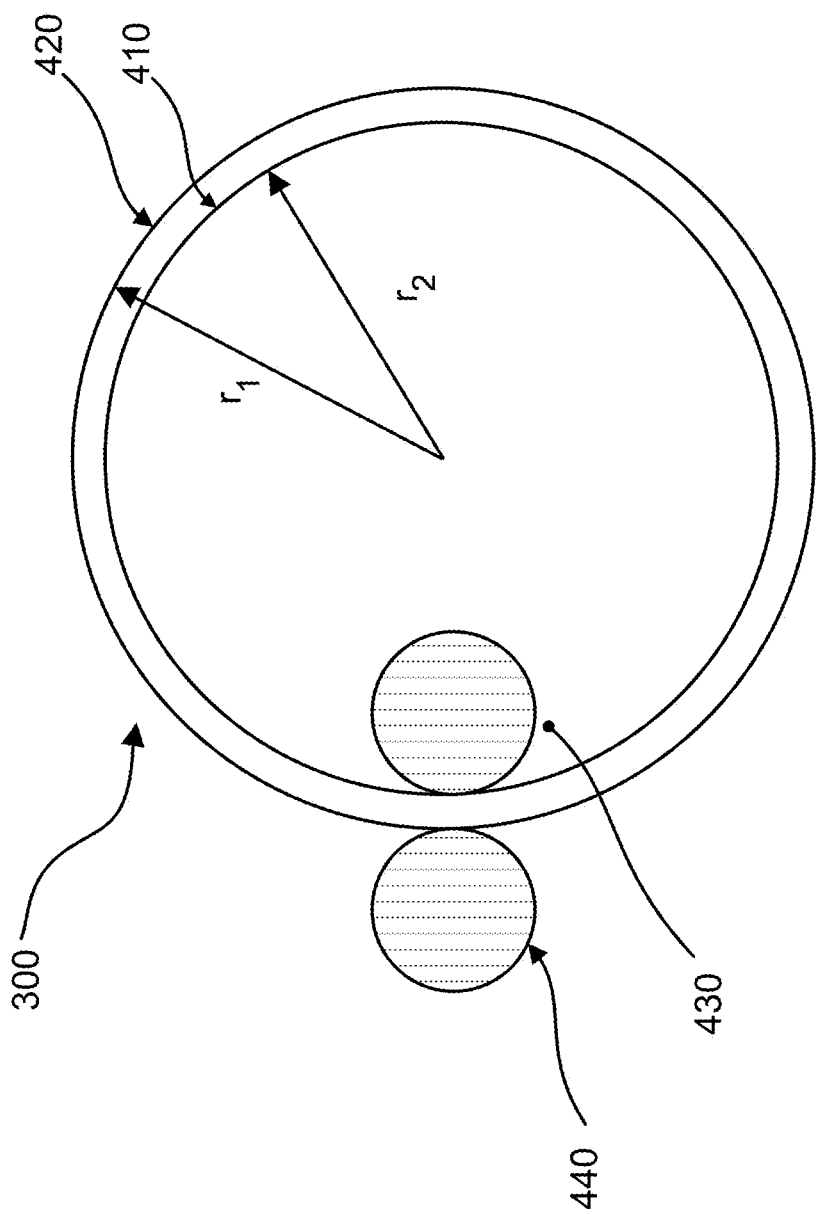
FIG. 4 is a cross section of an example tube and a measuring tool, according to one embodiment.

FIG. 4 illustrates a cross section of a tube 300. The tube 300 has an inner surface 410 and an outer surface 420. In some embodiments, the inner surface 410 is not concentric with the outer surface 420, causing inconsistencies in the wall thickness of the tube 300. The wall thickness of the tube 300 may vary for all positions "x" and "a" more than a threshold tolerance for a cutting ring, creating uneven current flow and energy concentration through the ring. In the example embodiment illustrated in FIG. 4, an instrument with movable contacts 430 and 440 is used to determine the wall thickness at any point. One contact 430 touches a point on the inner surface 410 of the tube 300 so that the instrument can measure the radial distance from a reference surface to the contact point 430 on the inside of the tube. A second contact 440 touches a point on the outer surface 420 of the tube 300 to measure the radial distance from a reference surface to the contact point 440 on the outside of the tube. The contact point of the second contact 440 rests on the outer surface 420 of the tube and has the same "a" and "x" coordinates as the contact point 430 on the inner surface 410 of the tube. Consequently, the contacts 430 and 440 are on the same radial line, but at different distances from the x axis of the tube 300. The tube rotates, holding "x" constant, and the two contacts 430 and 440 measure the wall thickness of the tube 300 as a function of coordinate "a" from 0 to 360 degrees. The resulting data includes a map of wall thicknesses and associated locations for the tube 300. The wall thickness data enables the calculation of a cutting pattern with ring height as a function of coordinate "a". This data informs the laser cutting path that provides a substantially similar current carrying cross-sectional area over the entire path of the electrical current.

In some embodiments, the system measures the wall thickness of the tube 300 by inserting a small source of gamma radiation into the tube. The intensity of the gamma radiation is measured with a detector outside of the tube 300. The system calculates the wall thickness by using the gamma ray intensity as an inverse function of the wall thickness. In some embodiments, the system measures the wall thickness using mechanical calipers or a micrometer with tips shaped to measure the tube 300's wall thickness. The mechanical calipers or micrometer have an electronic data output to a workstation where data for the wall thickness is collected. The system may alternatively measure the tube 300 wall thickness with an acoustic probe. In some embodiments, an ultrasonic transducer injects acoustic pulses at the outer surface 420 of the tube 300 and measures the time elapsed for the sound to reflect off the inner surface 410 and return to the outer surface 420. In some embodiments, an acoustic microscope operating at high frequency (e.g., 1 to 5 gigahertz) is used to inject the acoustic pulses. The acoustic microscope could find major defects in the tube 300 such as voids or large inclusions (e.g., carbides, oxides, nitrides). In response to detecting major defects, the system may signal the laser to skip that part of the tube or to translate the ring cut pattern such that the defect falls outside of the ring boundaries. In some embodiments, the system uses x-ray computer tomography to determine the wall thickness of the tube 300. In some embodiments, the system uses opposing mechanical indicator arms as depicted in FIG. 4. The mechanical indicator arms are positioned with one inside the tube, one outside, and both colinear with one another on the same radial line of the tube. The mechanical indicator arms are read differentially, relative to a reference surface. In some embodiments, the system uses capacitance probes to determine the wall thickness of the tube 300.

The described methods for measuring the tube 300 wall thickness each provides angular and thickness resolutions to significantly improve the uniformity of current density when the ring is in use for a capsulotomy procedure. For example, capacitance probes can be made small enough to resolve+/− 0.001 mm in gap distance, and resolution better than 10 degrees rotationally. As another example, mechanical probes may provide resolutions better than 1 degree in "a" and 0.001 mm in wall thickness. Additionally, when using a wall thickness probe that is entirely external to the tube 300, it is not necessary to move the probe in and out of position. For example, the acoustic probe, acoustic microscopy, gamma ray detection, and X-ray tomography can be entirely external from the tube 300. In such cases, the measuring tool may allow for the tube to be held vertically as it is cut so that rings can drop down over a probe body as they are cut off the tube.

Figure 5:
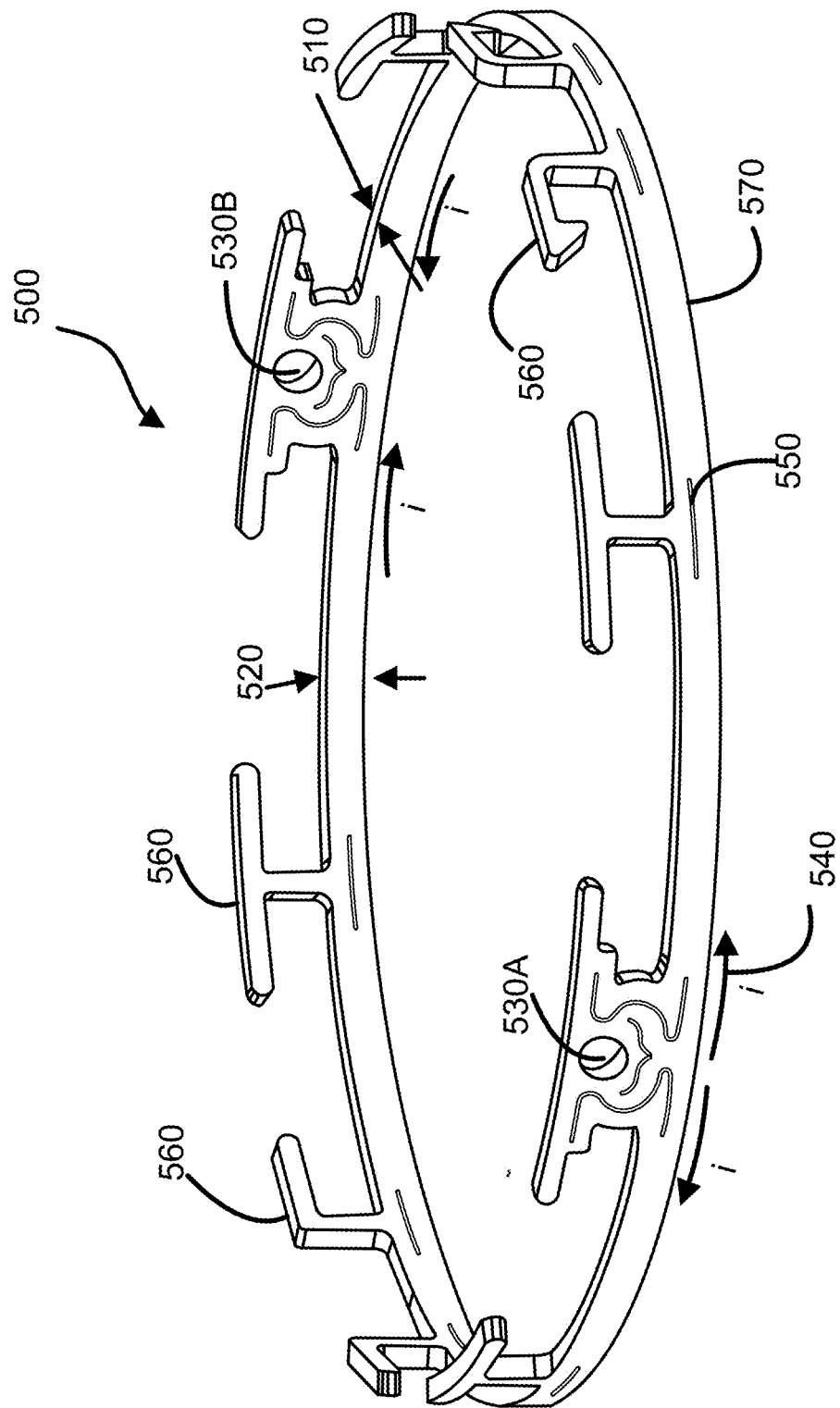
FIG. 5 is an example ring cut from a tube with a variable wall thickness and ring height, according to one embodiment.

FIG. 5 illustrates an example ring 500 cut from a tube 300, in accordance with one embodiment. The ring 500 has a variable wall thickness 510 and variable wall, or ring, height 520. The cutting path for the wall height 520 is calculated from the data of the wall thickness map. Holes 530A and 530B in the ring 500 are connection points for electrical wires. Electrical current from the electrical wires flows as indicated by circumferential arrows 540, labeled "i". In alternative embodiments, electrical current may flow axially, between electrical connections having different x coordinates. Slots 550 prevent heat from flowing upwards through the ring 500 into the tabs 560. The tabs 560 may hold the ring 500 in place within a suction cup. The slots 550 minimize the heat sinking effect of the tabs 560. On the millisecond time scale of the heating pulses used in this ring, the slots 550 trap enough heat to cut a collagen membrane near the bottom edge 570 of the ring 500. The bottom edge 570 may be in contact with the anterior capsule of the lens of an eye during use of the device 100.

Figure 6:
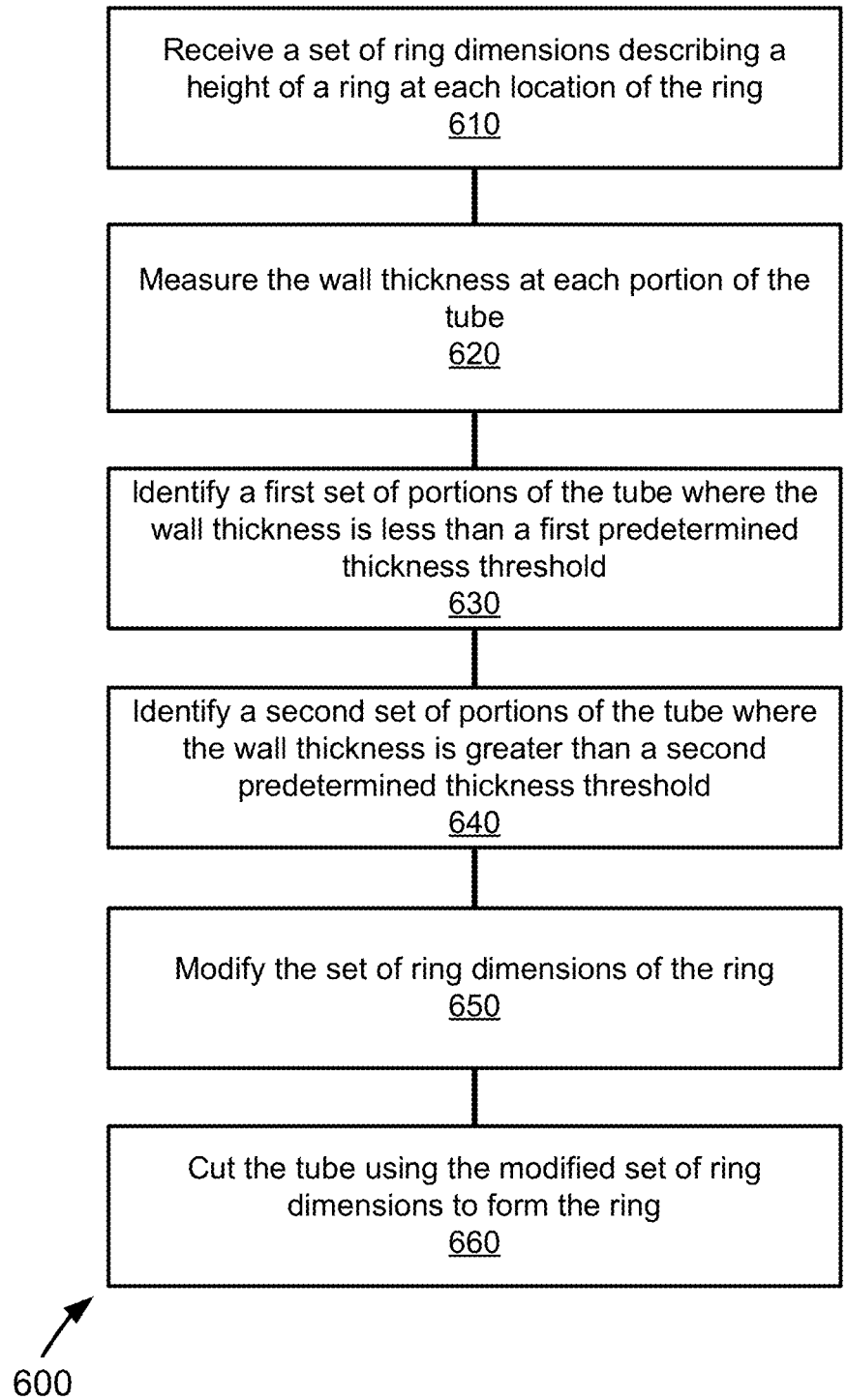
FIG. 6 is a flowchart illustrating an example method for modifying a ring wall height, according to one embodiment.

FIG. 6 is a flowchart illustrating a method for using the wall thickness of the tube 300 to modify a set of ring dimensions for a ring cutting path. The system receives 610 a set of ring dimensions describing a height of a ring at each location of the ring. In one example, the ring dimensions may describe a pattern for cutting the ring 500, as illustrated in FIG. 5. The set of ring dimensions may be for any ring design. In some embodiments, the system uses the set of ring dimensions to create a cutting path for a laser to cut a ring from a tube 300.

The system 600 measures 620 the wall thickness at each portion of the tube. Measuring the tube may be performed by gamma radiation, mechanical calipers or a micrometer, an acoustic probe, X-ray computed tomography, opposing mechanical dial indicator arms, or capacitance probes. The mapping of the tube may be done more than once to avoid anomalous recordings, in some embodiments. In some embodiments, the system 600 may map the tube every millimeter (mm), 100 mm, 22 mm, 300 mm, or another set distance. In some embodiments, the system measures the wall thickness every degree as the tube 300 is rotated for a total of 360 measurements. In other embodiments, the tube 300 is measured every 10 degrees for a total of 36 measurements, or every 90 degrees for a total of 4 measurements. A probe is used to map the wall thickness around the tube 300 for the next section of tube to be cut.

The system 600 may identify 630 a first set of portions of the tube where the wall thickness is less than a first predetermined thickness threshold and may identify a second set of portions of the tube where the wall thickness is greater than a second predetermined thickness threshold. In embodiments where the cross-section is rectangular, the system 600 applies the equation:

$$H = \frac{A}{WT}$$

where H represents the ring wall height, A represents a target cross-sectional area, and WT represents a wall thickness that is measured for the tube. In some embodiments, the cross-section may be a different shape and the system 600 uses a different equation for determining the area of a cross-section of the shape. In some embodiments, the target cross-sectional area is a predetermined constant used to guide modifications to the ring dimensions, such that the ring dimensions maintain a substantially similar cross-sectional area to an intended cross-sectional area. In some embodiments, a variance in a target wall thickness is detected at a location within a medium from which a ring is to be cut. In response, the system 600 may determine an actual height for the location based on the actual wall thickness (e.g., the "width") and based on a target cross-sectional area for the ring. The system 600 may repeat this process for each location of the ring where the actual wall thickness varies from the target wall thickness, selecting actual wall heights for the ring to achieve a cross-sectional area for the location that is equal or substantially similar to the target cross-sectional area at the location.

The system 600 modifies 650 the set of ring dimensions of the ring. The system 600 adjusts the cut height at each portion of the ring with a wall thickness less than or greater than a permissible threshold difference. The system 600 modifies the ring cut heights to maintain a substantially similar cross-sectional area value within a tolerance. The system determines the constant cross-sectional area by multiplying the intended ring height by the intended wall thickness to determine a target cross-sectional area for all angular locations "a" from 0 to 360 degrees at the same "x" coordinate. In some embodiments, the system 600 stores the modified set of ring dimensions along with the wall thickness detected at the portion of the ring that is modified. In cases where a ring has a complicated geometry and current flow with components in both the "x" and "a" directions, the system 600 may use electro-thermal finite element analysis to design the cutting path such that the best uniformity of heating is attained. In some embodiments, the system 600 creates a full library of modified patterns calculated to cover a full range of possible wall thicknesses. The system 600 may store the library of modified patterns and wall thicknesses as a look-up table. For example, the system 600 may create the library with a range of wall thicknesses in increments of 0.5 microns. If the system encounters the same wall thickness at the same part of a pattern of the ring design, the system may forego calculations and use the stored modified set of ring dimensions to cut the ring. The system 600 may query the look-up table with a measured wall thickness to identify a modified set of ring dimensions. The cutting path must be smooth between regions of varying wall thicknesses, so the system 600 may generate a final cutting path to apply with a predetermined minimum allowed radius of curvature, or a maximum radius of curvature for each change of direction. The system 600 cuts 660 the tube using the modified set of ring dimensions to form the ring. Normal laser cutters run the same program over and over for the whole length of a tube, but the system 600 dynamically adjusts to the wall thickness of the tube as it is advanced through the system.

Figure 7:
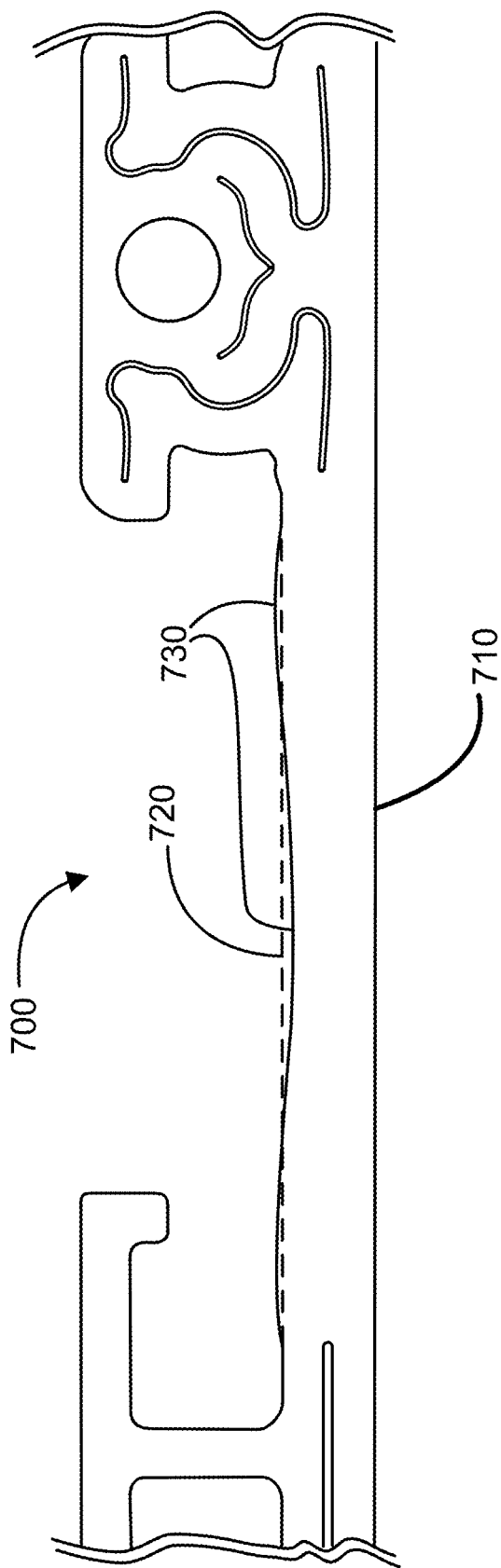
FIG. 7 is a sideview of a section of a current carrying beam with a modified cutting path for a laser to follow, according to one embodiment.

FIG. 7 illustrates a side view of a section of a current carrying beam 700 that was cut using the system 600. The beam has a bottom edge 710 that lies in one plane and makes uniform contact with the membrane to be cut. For example, the membrane may be the anterior lens capsule of an eye. The beam has a top edge 730 that is cut according to the system 600 to maintain a substantially similar cross-sectional area along the electrical current path of the beam. The dashed line 720 shows the cutting path that would have been used if the system 600 had not modified the path to maintain a substantially similar cross-sectional area. The actual cutting path 730 accounts for corrections to compensate for variations in the beam 700's wall thickness.

Figure 8:
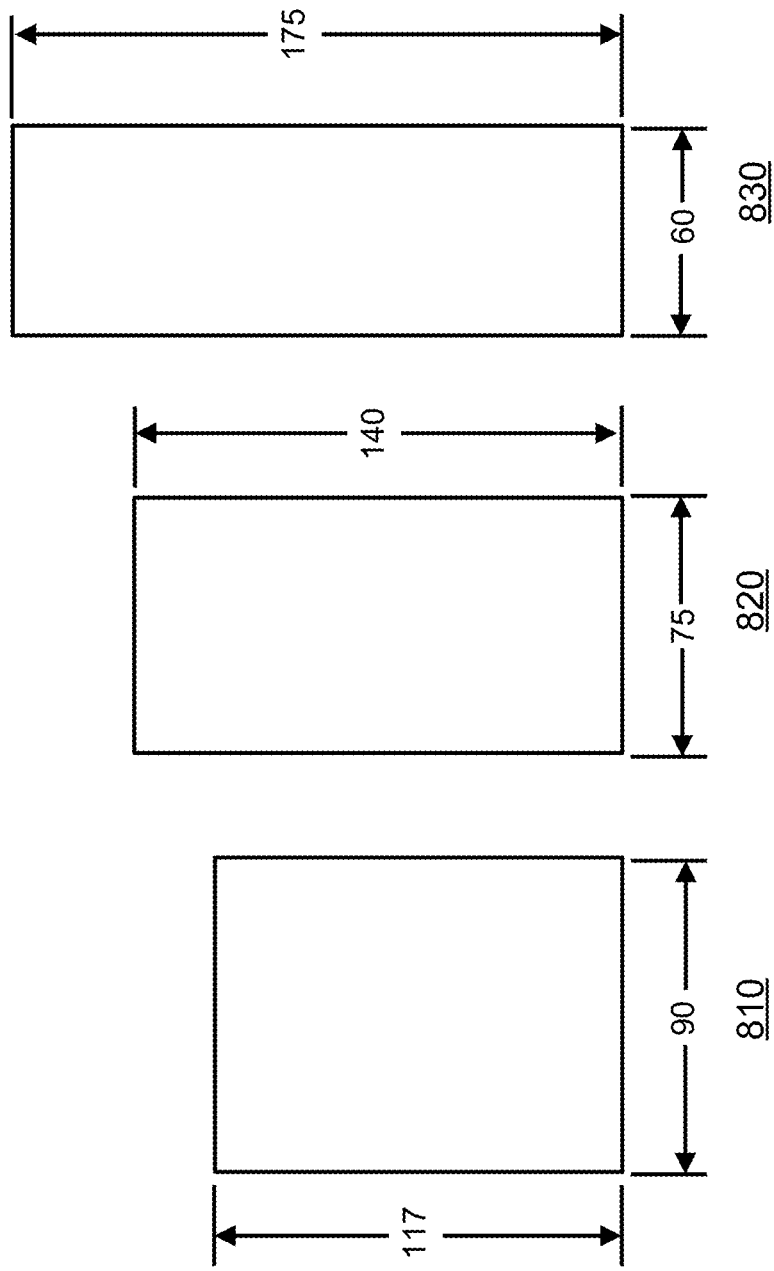
FIG. 8 is a cross section view of a portion of a ring to compare cross-sectional areas, according to one embodiment.

FIG. 8 illustrates an example cross-section view of a portion of a ring to compare cross-sectional areas. The ring dimensions are in microns to compare the ring height where wall thickness is 60 microns 830, 75 microns 820, and 90 microns 810. In each example cross section, the cross-sectional area is the same, 10,500 square microns. The system modified the dimensions of each example portion of a ring. The ring height is cut at 117 microns where the wall thickness is 90 microns to maintain the cross-sectional area of 10,500 square microns. Similarly, the wall height is cut at 175 microns where the wall thickness is measured to be 60 microns and 140 microns where the wall thickness is 75 microns.

Figure 9:
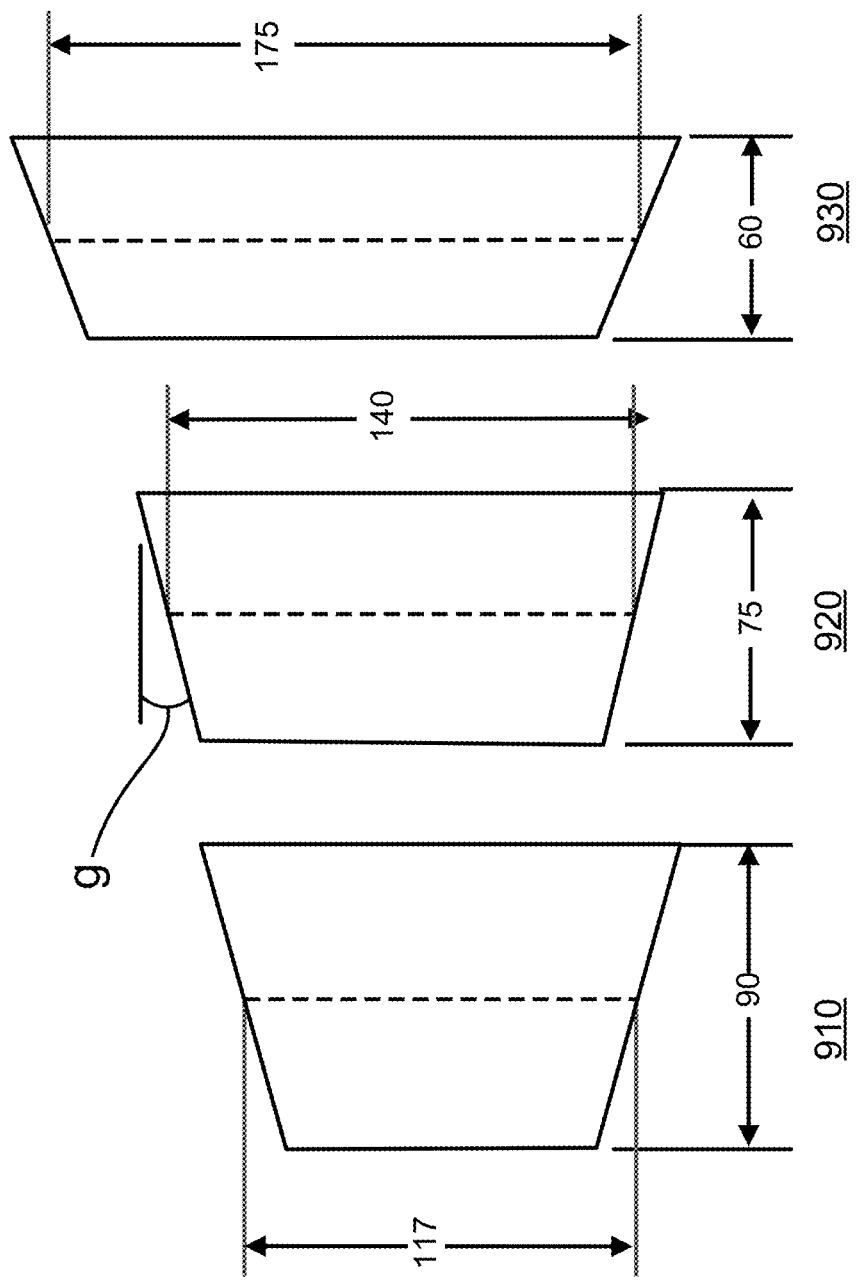
FIG. 9 is a cross section view of a portion of a ring with an example sidewall draft angle on an edge of a laser cut, according to one embodiment.

FIG. 9 illustrates a cross-section view of a portion of a ring with an example sidewall draft angle on an edge of a laser cut. The system maintains a substantially similar cross-sectional area for each example by modifying the height of the ring. In some embodiments, the cross-sectional area is maintained by using a known draft angle produced by the laser settings employed in cutting the rings. Upon measuring a wall thickness of 90 microns 910, the system modifies the height of the ring wall to 117 microns. The system modifies the height to 140 microns for a wall thickness of 75 microns 920 and 175 microns for a wall thickness of 60 microns 930. All the modifications result in the same cross-sectional area.

Figure 10:
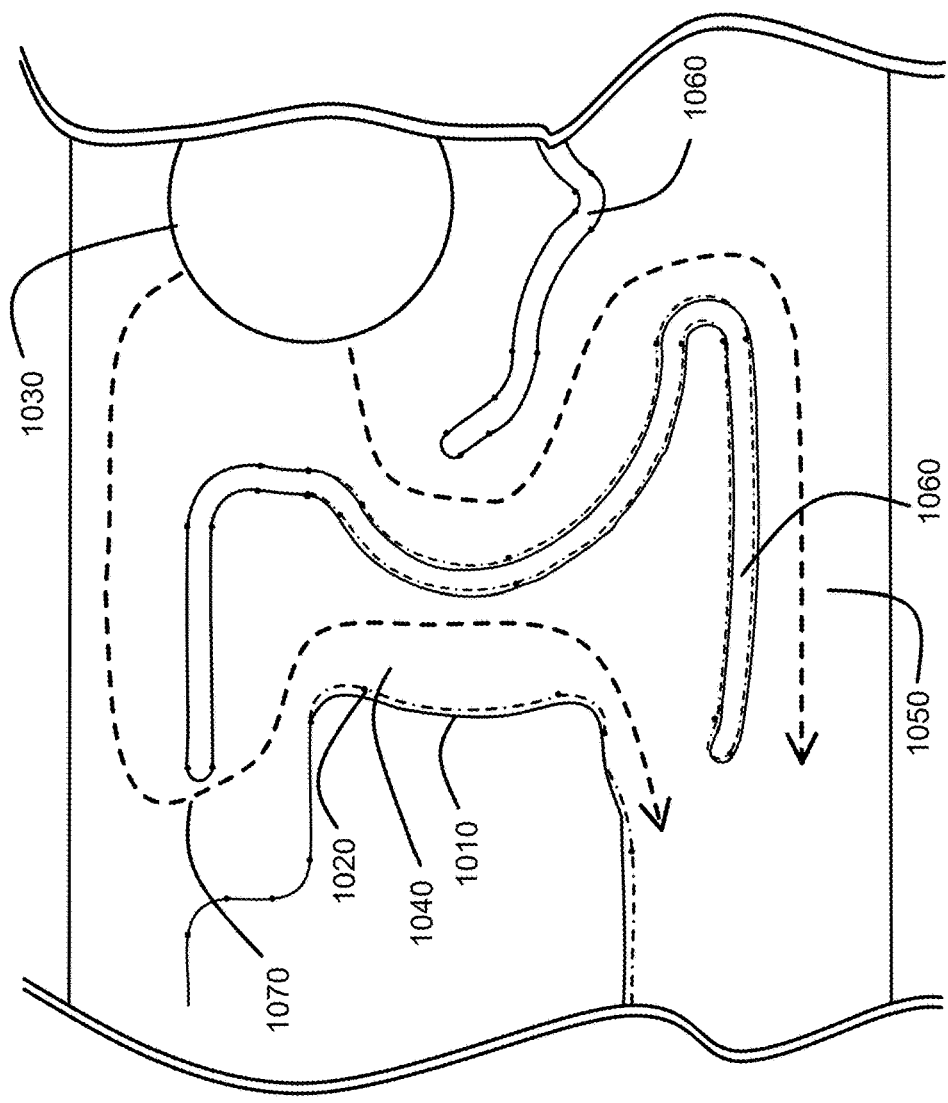
FIG. 10 is a partial sideview of a wire tab showing a cut pattern and a modified cut pattern, according to one embodiment.
Figure 10:
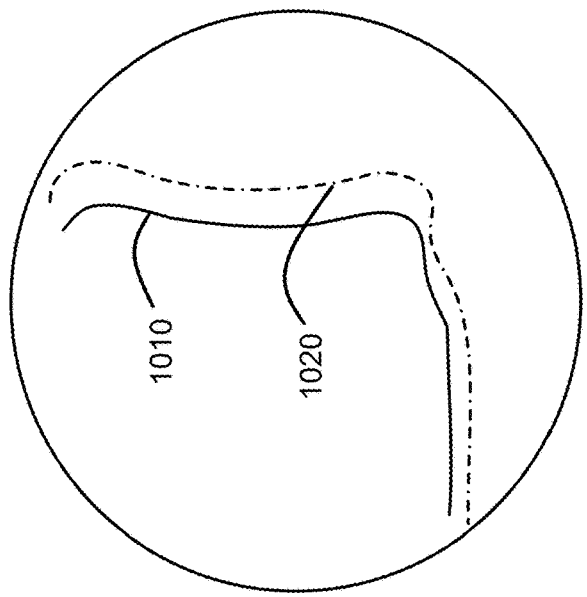

FIG. 10 illustrates a partial sideview of a wire tab 1000 feature on an example ring, in accordance with one embodiment. FIG. 10 illustrates the target cut pattern 1010 with a solid line. The target cut pattern has an associated target cross-sectional area, target wall thickness, and target height. FIG. 10 illustrates the modified cut pattern 1020 as a dotted line. The system determines that the wall thickness of the wire tab 1000 is thicker than the target wall thickness. Based on the equation $$H = \frac{A}{WT}$$

the system determines the modified cut pattern, while keeping the target cross-sectional area constant or substantially constant. The wire tab 1000 has a wire contact point 1030, shunt path 1040, and center heating path 1050. Slots 1060 define the current path and block heat flow back to the wire at the wire contact point 1030. FIG. 10 depicts approximate electrical current paths through the wire tab 1000 with dashed line 1070. As depicted, the current path may flow in the "x" (axial) direction in some regions, and in other regions, the "x" and "a" direction. The system calculates the modified cut pattern such that the height of the wire tab 1000 perpendicular to the current path 1070, multiplied by the wall thickness at that location, gives the target cross-sectional area. Based on the system's calculations, the system creates the modified cut path 1020 to account for the variations in wall thickness around the wire tab.

What is claimed is:

1. A ring for use in surgical operations, the ring corresponding to a ring design specifying, for each of a plurality of locations of the ring, a target width and a target height of the ring at the location, wherein the ring, when cut from a cylindrical medium, comprises an actual height and an actual width for at least a first location of the plurality of locations that differ from the target width and the target height at the first location such that an actual cross-sectional area of the ring at the first location is substantially similar to a target cross-sectional area of the ring, wherein the actual cross-sectional area of the ring at the first location is determined based on the actual height and actual width of the ring at the first location and wherein the target cross-sectional area of the ring at the first location is determined based on the target height and the target width of the ring at the first location.

2. A method for cutting rings from a tube for a capsulotomy device, the method comprising:
   receiving a set of ring dimensions describing a height of a ring at each location of the ring;
   measuring a wall thickness at each portion of the tube;
   identifying a first set of portions of the tube where the wall thickness is less than a first predetermined thickness threshold;
   identifying a second set of portions of the tube where the wall thickness is greater than a second predetermined thickness threshold;
   modifying the set of ring dimensions of the ring by:
      increasing the height of the ring at one or more locations of the ring corresponding to the first set of portions of the tube; and
      reducing the height of the ring at one or more locations of the ring corresponding to the second set of portions of the tube; and
   cutting the tube using the modified set of ring dimensions to form the ring.

3. The method of claim 2, further comprising:
   identifying a predetermined cross-sectional area of the ring at a first location of the ring.

4. The method of claim 3, wherein increasing the height of the ring at the first location produces the predetermined cross-sectional area at the first location.

5. The method of claim 3, wherein reducing the height of the ring at the first location produces the predetermined cross-sectional area at the first location.

6. The method of claim 2, wherein modifying the set of ring dimensions comprises querying a look-up table with the measured wall thickness to identify the modified set of ring dimensions.

7. The method of claim 2, wherein cutting the tube comprises:
   generating a cutting program, the cutting program comprising instructions for a laser to cut the tube according to the modified set of ring dimensions.

8. The method of claim 2, wherein measuring the wall thickness at each portion of the tube comprises:
   inserting in the tube a source of gamma radiation;
   measuring the intensity of the gamma radiation with a detector; and
   calculating the inverse of the intensity of the gamma radiation to determine the wall thickness.

9. The method of claim 2, wherein measuring the wall thickness at each portion of the tube comprises:
   applying an acoustic probe at an outer surface of the tube;
   measuring an elapsed time for a sound to reflect off of an inner surface of the tube and return to the outer surface of the tube; and
   calculating the wall thickness from the elapsed time.

10. The method of claim 2, wherein measuring the wall thickness at each portion of the tube comprises:
    fitting one or more calipers comprising tips shaped to measure the wall thickness of the tube; and
    collecting data comprising the wall thickness electronically from the one or more calipers.

11. A non-transitory computer readable medium storing computer code comprising instructions for cutting rings from a tube for a capsulotomy device that, when executed by one or more processors, cause the one or more processors to perform steps comprising:
    receiving a set of ring dimensions describing a height of a ring at each location of the ring;
    measuring a wall thickness at each portion of the tube;
    identifying a first set of portions of the tube where the wall thickness is less than a first predetermined thickness threshold;
    identifying a second set of portions of the tube where the wall thickness is greater than a second predetermined thickness threshold;
    modifying the set of ring dimensions of the ring by:

reducing the height of the ring at one or more locations of the ring corresponding to the first set of portions of the tube; and increasing the height of the ring at one or more locations of the ring corresponding to the second set of portions of the tube; and cutting the tube using the modified set of ring dimensions to form the ring.

12. The non-transitory computer readable medium of claim 11, further comprising:

identifying a predetermined cross-sectional area of the ring at a first location of the ring.

13. The non-transitory computer readable medium of claim 12, wherein increasing the height of the ring at the first location produces the predetermined cross-sectional area at the first location.

14. The non-transitory computer readable medium of claim 12, wherein reducing the height of the ring at the first location produces the predetermined cross-sectional area at the first location.

15. The non-transitory computer readable medium of claim 11, wherein modifying the set of ring dimensions comprises querying a look-up table with the measured wall thickness to identify the modified set of ring dimensions.

16. The non-transitory computer readable medium of claim 11, wherein cutting the tube comprises:

generating a cutting program, the cutting program comprising instructions for a laser to cut the tube according to the modified set of ring dimensions.

17. The non-transitory computer readable medium of claim 11, wherein measuring the wall thickness at each portion of the tube comprises:

inserting in the tube a source of gamma radiation;

measuring the intensity of the gamma radiation with a detector; and calculating the inverse of the intensity of the gamma radiation to determine the wall thickness.

18. The non-transitory computer readable medium of claim 11, wherein measuring the wall thickness at each portion of the tube comprises:

applying an acoustic probe at an outer surface of the tube; and measuring an elapsed time for a sound to reflect off of an inner surface of the tube and return to the outer surface of the tube; and calculating the wall thickness from the elapsed time.

19. The non-transitory computer readable medium of claim 11, wherein measuring the wall thickness at each portion of the tube comprises:

fitting one or more calipers comprising tips shaped to measure the wall thickness of the tube; and collecting data comprising the wall thickness electronically from the one or more calipers.

20. A system comprising:

one or more processors; and a memory configured to store computer code comprising instructions for cutting rings from a tube for a capsulotomy device, the instructions, when executed by the one or more processors, cause the one or more processors to perform steps comprising:

receiving a set of ring dimensions describing a height of a ring at each location of the ring;

measuring a wall thickness at each portion of the tube;

identifying a first set of portions of the tube where the wall thickness is less than a first predetermined thickness threshold;

identifying a second set of portions of the tube where the wall thickness is greater than a second predetermined thickness threshold;

modifying the set of ring dimensions of the ring by:

reducing the height of the ring at one or more locations of the ring corresponding to the first set of portions of the tube; and increasing the height of the ring at one or more locations of the ring corresponding to the second set of portions of the tube; and cutting the tube using the modified set of ring dimensions to form the ring.

21. The system of claim 20, wherein cutting the tube comprises:

generating a cutting program, the cutting program comprising instructions for a laser to cut the tube according to the modified set of ring dimensions.

* * * * *